United States Patent [19]

Greer, Jr.

[11] Patent Number: 4,683,669
[45] Date of Patent: Aug. 4, 1987

[54] MOTOR ELEMENT FOR FACIALLY ANIMATED MANNEQUIN

[76] Inventor: Thomas J. Greer, Jr., 727 23rd St. S., Arlington, Va. 22202

[21] Appl. No.: 618,728

[22] Filed: Jun. 8, 1984

Related U.S. Application Data

[63] Continuation-in-part of Ser. No. 487,417, Apr. 28, 1983, abandoned, which is a continuation of Ser. No. 280,367, Jul. 6, 1981, abandoned.

[51] Int. Cl.$^4$ .............................................. G09F 19/08
[52] U.S. Cl. ..................................... 40/414; 40/416; 40/463; 446/337
[58] Field of Search ................. 40/411, 412, 414, 416, 40/422, 455, 457, 463; 446/41, 44, 135, 156, 337, 338, 391–396

[56] References Cited

U.S. PATENT DOCUMENTS 2,532,876 12/1950 Asche et al. ...................... 128/89 R
4,177,589 12/1979 Villa ..................................... 40/463
4,236,347 12/1980 Fauls ..................................... 46/156

FOREIGN PATENT DOCUMENTS 475405 4/1985 Fed. Rep. of Germany ........ 177/93
364387 11/1938 Italy ................................ 446/135 R Primary Examiner—Gene Mancene
Assistant Examiner—J. Hakomaki
Attorney, Agent, or Firm—Thomas J. Greer, Jr.

[57] ABSTRACT

An animated mannequin head for simulating human facial expressions. A rigid substrate in the form of a head is partially covered with elongated, pressurized fluid filled tubes. The tubes, termed tube motor elements, are either covered by or are embedded in a deformable layer/stratum, the outer surface of which is textured and tinted to simulate facial skin, the layer/stratum positioned on the head to simulate a face. Upon variation of the fluid pressure within various groups of the tube motor elements, various facial expressions may be simulated. In a first embodiment, helical coil springs are used instead of pressurized tubes, passage of direct current through the coils causing them to contract, the coils being embedded in a deformable layer/stratum. In a second embodiment, a grid of parallel wires is embedded in the simulated skin, passage of direct current through selected segments of selected pairs of wires causes them to move together, at right angles to their length, thus distorting the skin.

38 Claims, 13 Drawing Figures

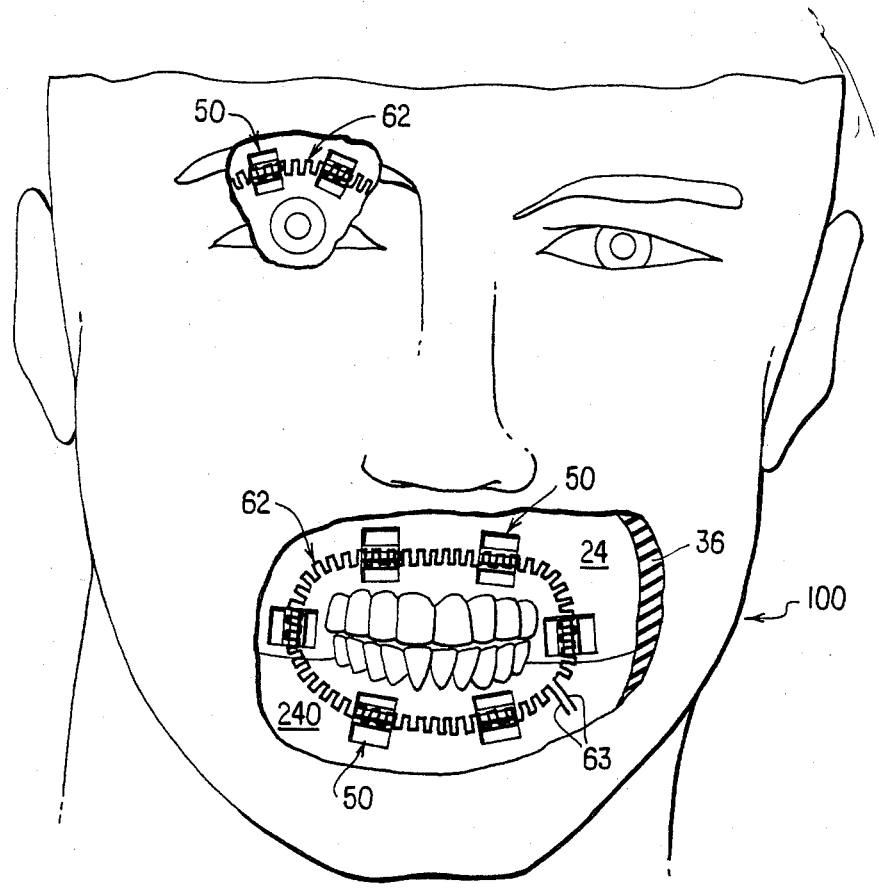
FIG. 12
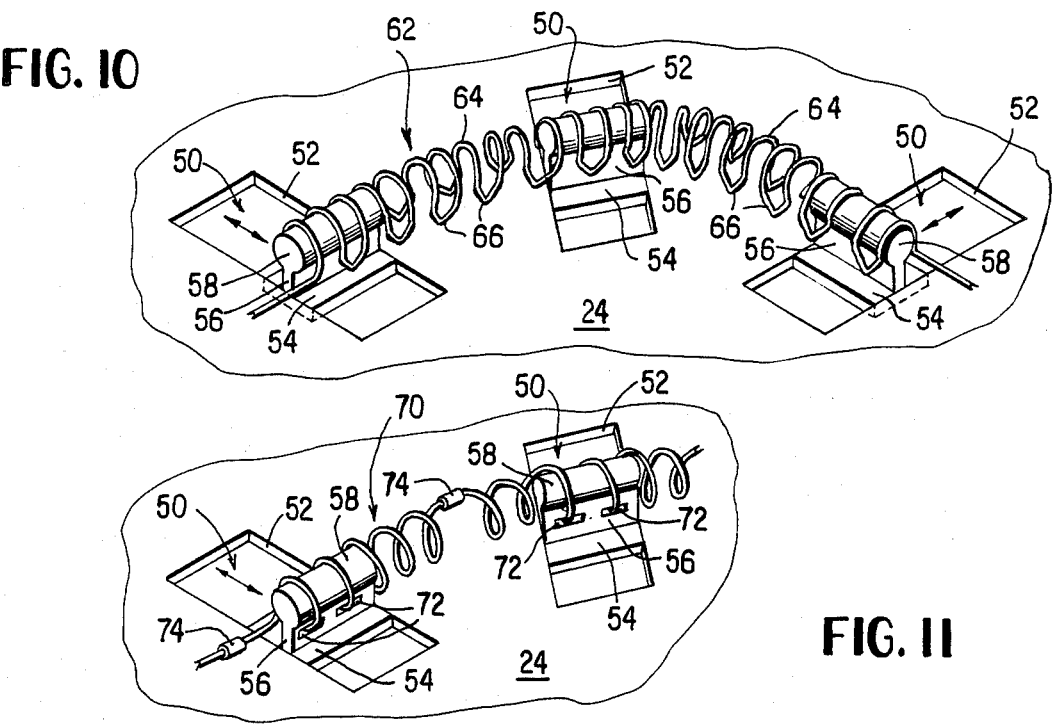
FIG. 10
FIG. 11

MOTOR ELEMENT FOR FACIALLY ANIMATED MANNEQUIN

This is a continuation in part application of my co-pending application Ser. No. 487,417, filed Apr. 28, 1983, now abandoned, which was in turn a continuation application of my abandoned Ser. No. 280,367 filed July 6, 1981.

This invention relates to animated mannequins and more particularly to the combination of a facial skin simulating layer or stratum and a motor element for distorting the simulated skin.

In U.S. Pat. No. 4,177,589, issued to Villa a motor element for a facially animated mannequin is defined by a piston and cylinder (42) wherein the piston is moved by the application of pneumatic pressure within the cylinder, the movement of the piston varying with changes of pressure in the cylinder. The motor element is coupled to and actuates springs around the mouth. While apparently satisfactory for the mannequin described in that patent, such motor elements can only imperfectly simulate or imitate actual local distortions or movements of facial skin which take place during human speech and expressions of emotion. In the human face, the facial muscles are elongated, assuming a form similar to narrow, parallel tubular elements. According to the practice of this invention a more faithful imitation of the facial muscles and hence expressions in the human face is achieved by the use of novel motor elements. The motor elements in one embodiment are defined by bellows tubes of relatively small diameter, so that upon the application of varying fluid pressure within, the tubes will either lengthen or contract. The tubes are connected to a skin-simulating flexible layer or stratum, so that elongation or contraction of the tube motor elements causes surface movement or distortion of the mannequin skin. The motor elements of this invention are to be distinguished from motors, such as solenoids and the like, for moving the pivoted jaw or rolling the eyes of a mannequin.

There are two essential forms of the bellows motor element of this invention, both forms preferably operating from a steady-state or operating point fluid pressure which elongates the motor elements to a steady-state length greater than their unpressurized (such as atmospheric pressure) length. In one form, a deformable tube is provided with expansible bellows, the bellows exterior surface being constructed so as to define a continuous spiral groove therealong. A resilient spring element, such as a steel spring, is placed within the spiral groove. In the mode of operation of this embodiment, an increase of fluid pressure within the tube above its steady-state or normal value causes the tube and its surrounding spring to elongate beyond its steady-state length by virtue of the expansible bellows. Upon relaxation or reduction of fluid pressure, the resilient coil spring acts to return the tube to its steady-state length. Further reduction in fluid pressure causes the tube to further contract in length (from its steady-state fluid pressure length), due also to the action of the coil spring. A skin-simulating flexible sheet (both elastic and flexible or merely flexible, as later will be explained) is attached to the tube motor elements. Elongation and contraction of the motor elements results in corresponding stretching or bulging of the skin-simulating sheet.

In a second form, the motor element is again defined by a tube having expansible bellows, the bellows exterior not having to be spiral, although it may be spiral. Each tube motor element is at least partially encased within a substrate or thick sheet of an elastic substrate, the substrate defining on one surface thereof a simulated human skin. Upon an increase in fluid pressure within the tube motor, the tube will lengthen. Upon relaxation of such pressure, the elasticity of the elastic substrate will cause the tube to shorten to its steady-state length. Further reduction in fluid pressure results in further shortening of the tube, due to the elasticity of the substrate. Thus, in the steady-state fluid pressure condition, i.e., the operating pressure value, the elastic substrate is stretched. Alternatively, the resiliency of an elastic, associated skin-simulating sheet may be employed in lieu of a thick stratum.

In both bellows embodiments, contraction of the tube motor element will be accompanied by a distortion of the adjacent or continuous skin-simulating substrate or layer to thereby imitate movement of human facial skin as occurs during conversation or emotion. In the first embodiment, the skin layer may be placed on top of the motor elements, with the motor elements being secured to and resting on a hard substrate representing a human skull. In a second embodiment, the elastic substrate which encases the motor elements is attached to and carried by the human skull model.

The tube motor elements may be inherently elastic, or they may be made elastic by a spring, or they may be merely deformable along their length. In the first two cases, the skin-simulating substrate sheet need not be elastic, although it may be. In the third case, the skin-simulating substrate sheet must elastic, so that it will contract upon a reduction in fluid pressure within the tube motor elements.

The elongated tubular motor elements of this invention may be employed in a single thickness layer or in the manner of fascia, i.e., a bundle of parallel tubes. The length of the bellows in any given group may be the same or different According to a modification of the invention, two superposed sheets or strata of the type previously described are placed over the frontal or face portion of the mannequin skull. The stratum immediately adjacent the head (the first stratum) is used to establish a first facial basis, corresponding to the identity of a first simulated individual. The second or exterior stratum is then employed to produce changing facial expressions for this simulated individual. During the operation of the animated mannequin head, the pressures in the tube motors of the first stratum are fixed in time, thereby fixing the identity of the first simulated individual. If it is now desired to simulate or to portray a second individual, the pressures of the tube motors of the first stratum are varied to establish a second facial basis, i.e., higher or lower cheekbones, larger or smaller jowls, differently shaped forehead, etc. Thereafter, the second or exterior stratum is employed as before to produce changing facial expressions.

According to yet another modification of the invention, the elongated, facial-muscle simulating motor elements are formed from helical coils through which pass direct current. The adjacent turns or whorls of the coils, in accordance with well known laws of physics, are attracted towards one another. The coils are embedded in a deformable skin-simulating layer or stratum so that upon movement of adjacent coil whorls towards each other, along the longitudinal axis of the coil, the stratum is deformed to thereby simulate facial expressions. The force of attraction between adjacent whorls may be increased by distributing small ferromagnetic particles, such as soft iron, throughout the embedding stratum or at least in those regions in the neighborhood of the coils.

In the event that the different in facial basis between two simulated individuals is relatively minor, then a single stratum will be sufficient to change the basis. In this case, it is only necessary to vary the steady-state pressures in the tube motors of the single stratum to establish a second set of steady-state pressures about which operation will take place.

IN THE DRAWINGS

FIG. 10 is a partial perspective view of a modification, somewhat similar to FIG. 8.

FIG. 11 is a partial perspective view of another modification.

FIG. 12 is a partial view illustrating the modification of FIGS. 10 and 11 as applied to a simulated human head.

Figure 1:
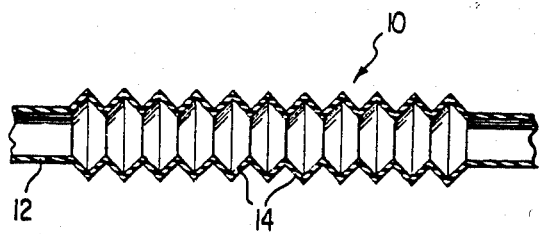
FIG. 1 is a partial cross-section view of a tube motor element according to one embodiment.

Referring now to FIG. 1 of the drawings, the numeral 10 denotes a tube motor element according to one embodiment of this invention. The element is in the form of tube 12 formed of elastomer or other deformable material. The tube is provided with a plurality of bellows sections denoted generally by the numeral 14. Alternatively, the tube and the bellows may be formed of thin metal. Depending upon how the tube 10 is used, (later to be described) it may be deformable and elastic, or may be merely deformable without the property of elasticity. The bellows elements may be normal to the longitudinal axis of the tube 10, or they may form a spiral. It will be seen that, with the tube ends closed to thereby define a closed volume, an increase in fluid pressure in the interior will result in an elongation of bellows portion of the tube. Any change in the diameter of the smooth portion or of the bellows portion will be negligible.

Figure 2:
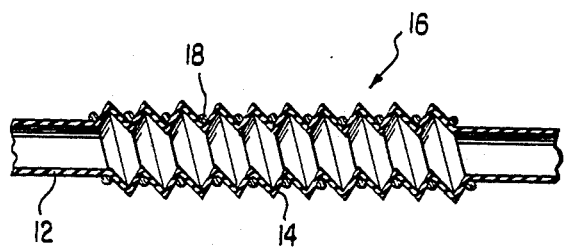
FIG. 2 is a similar view, showing a second embodiment.

Referring now to FIG. 2, the numeral 16 denotes a second embodiment of the tubular fluid motor of this invention, again defined by a tube 12 of generally thin walls. The expansible bellows portion 14 is of the same general construction as that shown in FIG. 1, but here it is in the form of a spiral. The spiral groove defined is provided with a spring element 18, such as a steel coil spring. In operation, an increase in fluid pressure within the interior of tube 12 will, again, result in elongation of the tube by expansion of the bellows 14. Upon relaxation of fluid pressure, the spring 18, due to its natural resiliency, will urge the tube 12 to return to its original or steady-state length.

Figure 3:
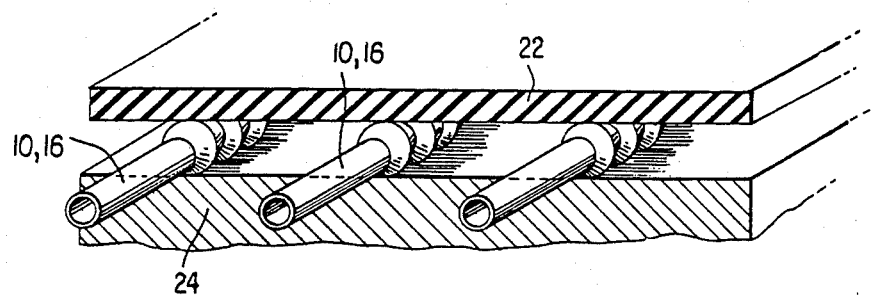
FIG. 3 is a partial perspective view showing how the tubular motor elements may be coupled to a deformable skin and a human skull base.

Referring now to FIG. 3 of the drawings, the numeral 24 denotes an external facial portion of simulated human skull or other mannequin head formed of plastic, wood, hard resinous material, or the like. The numeral 22 denotes a facial skin-simulating material defining a deformable layer of elastomer such as, for example, of methylpolysiloxane, natural rubber or synthetic rubber such as ethylene/propylene copolymers, SBR (butadiene/styrene copolymer), polyisobutylene, polybutadiene, nitrile rubbers (butadiene/acrylonitrile copolymers) and the like. These elastomers, which are characterized by the property of substantial elasticity or resiliency as well as the ability to be deformed or distorted without substantial stretching, are well known (U.S. Pat. Nos. 2,492,129 to Spring; 2,457,688 to Krieble; 3,454,676 to Busse; 3,467,620 to Orr; and 3,836,511 to O'Farrell). Alternatively, the facial skin-simulating material 22 may be comprised of a substance which is merely of deformable nature, i.e., one which is deformable, but which exhibits little, if any, resiliency or elasticity. Such materials are well known and include, for example, polyvinyl chloride, polyethylene, polypropylene, polyamides, such as Nylon 6,6, and polyesters, such as polyethylene terephthalate. Layer 22 and substrate 24 sandwich a plurality of tube motor elements, denoted generally by the numerals 10, 16, i.e., the motor element of either FIG. 1 or of FIG. 2 may be used. If the sheet 22 is elastic, either motor elements 10 or motor elements 16 may be employed. It is necessary that either the skin-simulating sheet member 22 or the motor element must provide resiliency to thereby return to a normal or steady-state position upon decrease of fluid pressure within the motor elements. If non-elastic motor elements 10 are chosen, then sheet 22 must be elastic. If the motor elements 10 are elastic, then the sheet 22 need only be deformable. If motor elements 16 are chosen, then sheet or layer 22 need only be deformable, although it may also be elastic. From a consideration of FIG. 3, the reader will observe that distortion of the skin-simulating layer 22 to simulate facial expressions may be achieved by a change in the fluid pressure in preselected sub-groups of the tubular motor elements. A steady-state pressure, preferably above atmospheric, within the motor elements 10, 16, is such that the motor elements are normally lengthened in their steady-state condition, i.e., a fixed facial expression of the mannequin. Variations of the pressure about this steady-state value will result in either a contraction and consequent bulging of layer 22 immediately contiguous to the particular sub-group of motor elements involved, or will result in a corresponding stretching of layer 22. Thus, in the embodiment of FIG. 3, to simulate a facial expression or an emotion on a mannequin head according to this invention, it is necessary to selectively vary the pressure within certain ones of the tubular motor elements 10, 16, about their steady-state value to thereby produce either a bulge or a stretching in the contiguous skin-simulating layer 22.

Figure 3A:
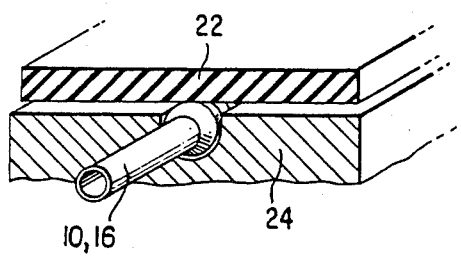
FIG. 3a is a view similar to FIG. 3, showing a modification thereof.

The tube motor elements 10, 16, of FIG. 3 may also be placed in complementary grooves on the surface 24 of the mannequin head, as shown at FIG. 3a. The midportion of a given tube motor for both FIGS. 3 and 3a is fixed to the substrate 24, as by adhesive, while the top portions of each or selected ones of the bellows elements 14 are attached, as by adhesive, to the lower surface of sheet 22.

The manner of correlating speech (lip movements, frowns, smiles, etc.) from an electrical or other speaker in the mannequin head 24 with pressure variations of specific sub-groups of motor elements 10, 16, to produce time varying correspondence between movements of portions of facial skin-simulating sheet 22 does not form a part of this invention. Such correlation may be established by routine experimentation. The amount of deviation from steady-state pressure is varied to produce a desired expression, by an amount dependent on the material of the simulated skin as well as the number and positioning of the motor elements.

Figure 4:
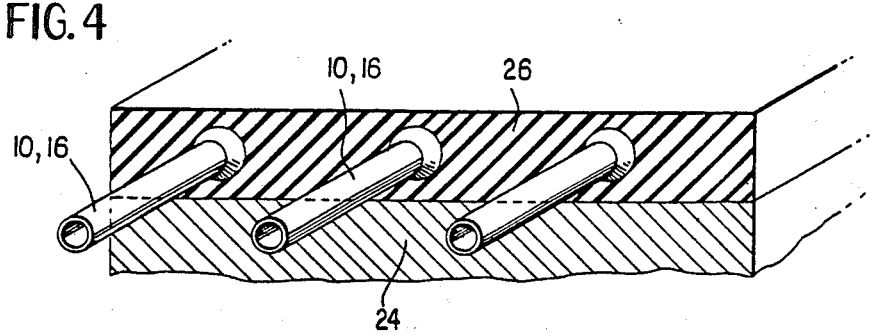
FIG. 4 is a view similar to FIG. 3, showing another way of coupling the tube motor elements to a skin-simulating layer.

Referring now to FIG. 4 of the drawings, another construction is shown, which may also employ either tube motor elements 10 or 16. In FIG. 4, the motor elements are completely embedded or encased within a relatively thick deformable layer or stratum 26, comprised of a deformable plastic or an elastomer as defined above in connection with sheet 22. Again, as with sheet 22, the outer surface of the layer is textured and colored to simulate human skin. As in the embodiment of FIG. 3, if the substrate 26 is merely deformable and not elastic, then elastic tube motor elements such as 16 must be employed. On the other hand, if the stratum 26 is elastic as well as deformable, then either a non-elastic motor element or the motor element 16 may be employed. The operation is similar to that described with respect to FIG. 3. The individual bellows sections of 14 are attached, as by adhesive, at their outer rims to the interior of circular passages running within stratum 26. Alternatively, the stratum 2 may be molded around the tube motors.

If the tube motor elements of either FIG. 3 or FIG. 4 are not elastic, then either the elastic skin (FIG. 3) or the elastic layer (FIG. 4) must be placed in association with the tubes when the tubes are pressurized to their steady-state pressure condition.

Figure 5:
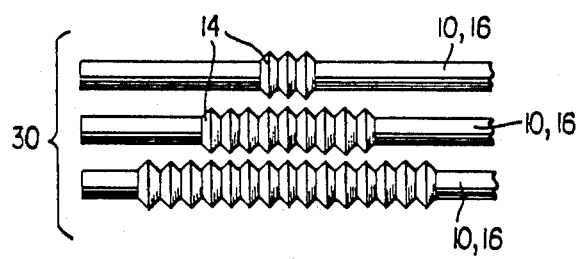
FIG. 5 is a view showing a group of three tubular motor elements of this invention lying in a plane, each motor element having a different bellows length.

Referring now to FIG. 5 of the drawings, an arrangement of the tube motor elements into sub-groups 30 is illustrated. In general, the motor elements (motors 10, 16) are parallel and substantially co-planar or at least follow the contour of the mannequin head substrate 24. While illustrated as being three in number, the reader will understand that any convenient number may define a sub-group 30. The length of the bellows elements on different ones of the several tube motors 10, 16, forming sub-group 30 is varied, so that for any one sub-group, a selected one or ones of the motor elements may be actuated (their pressures either increased or decreased) to produce different maximum motor stroke lengths of that particular sub-group. The sub-groups 30 may be used with the construction of FIG. 3 or FIG. 4.

Figure 6:
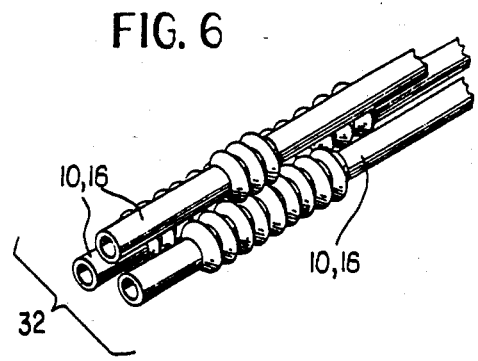
FIG. 6 is a view showing three tubular motor element of this invention, arranged non-coplanar and in the form of fascia, with the length of the bellows section of each being different.

Referring now to FIG. 6, the numeral 32 denotes a sub-group similar to sub-group 30 except here the tube motor elements 10, 16 are in a fasces or bundle, each member of the sub-group having a bellows portion of a different length. Again, selected ones of any sub-group 32 lying over the substrate 24 may be actuated by variation of fluid pressure therein. The reader will observe, from a consideration of FIGS. 5 and 6 and a comparison with FIGS. 3 and 4 that any of the sub-groups 30, 32 may be visualized as taking the place of any of the illustrated single motor elements. The choice of whether to employ generally flattened sub-groups 30 or relatively thick sub-groups 32 or single elements such as shown at FIGS. 3 and 4 will depend upon the length of the individual motor elements and upon the types of expressions which are contemplated for the mannequin, as well as the size of the mannequin head. It will also depend upon the motor element location on the mannequin face. For example, the lip muscle orbircircularis oris may be simulated by bundle groups 32, while the nose muscle dilatator naris anterior may be simulated by flat groups 30.

Motor elements of the general type of this invention are themselves already known. For example, U.S. Pat. No. 1,561,065 of 1924, issued to Eggleston discloses an expansible and collapsible element which includes a bellows construction with a spring. Further, U.S. Pat. No. 1,744,241 of 1930, issued to Pierle shows a deformable tube having a spiral corrugation, the corrugation being provided with a coil spring. Further, U.S. Pat. No. 4,241,740 of 1980, issued to Brown shows a contractable element of the same general type. However no one of these prior art constructions discloses the use of such a tubular element as a motor element for simulation or imitation of the muscles of the face, being in combination with a skin-simulating layer or sheet and a mannequin head.

Further, the use of bellows in animated human figures is already known. In U.S. Pat. No. 2,047,377 issued in 1936, to Liwschutz, as well as the same inventor's U.S. Pat. No. 2,065,473 issued in 1936, bellows are employed at the joints of articulated limbs for the purpose of moving the limbs. Pressure variations within the bellows cause their contraction/expansion with consequent limb motion. Liwschutz also contemplates such bellows for moving parts of the face of the figure, such as the lower jaw, the lips and the eyes. Additionally, Liwschutz employes a talking machine connected to the figure. While superficially similar to the present invention in the sense that both employ bellows, the bellows of Liwschutz is merely one type of fluid motor for effecting limb, jaw, eye, etc. movements of an animated figure. They are not used in any way to simulate by distortion any wrinkling, stretching, bulging or the like of facial skin on an animated mannequin.

In use, it will be apparent that each tube motor element interior forms part of a closed fluid volume, preferably of air. Pneumatic valves may be empoyed to modulate the air pressure within the various tube motors about their steady-state value. While shown as disposed parallel to each other, it will be apparent that the tube motors may be placed at angles to one another in different planes or layers.

The invention thus far described relates to the simulation of skin movements such as wrinkling, stretching, etc., on simulated skin for an animated figure or mannequin. Thus, with a head substrate 24 resembling a first individual, the practice of this invention will enable the simulation of a variety of facial expressions, usually those taken in connection with and corresponding to a voice of the figure. If it is desired to portray a second human, having different facial characteristics, then ordinarily a second head substrate 24 having a different facial basis or shape would be employed. However, according to another aspect of this invention, the use of a second or other deformable substrate such as 26 to portray other faces having different facial characteristics is not always necessary.

According to this additional aspect of the invention, a primary layer or stratum of elastomer or deformable material such as 26 with its associated tube motors 10, 16 is first placed over and mounted on the surface of the head substrate 24. Assuming that the entire face of the mannequin head 24 is covered with the primary layer, it will be immediately apparent that by suitable establishment of pressures within the various tube motors, desired facial basic characteristics such as thickness of lips, distance between eye sockets, height of cheekbones, etc. may be established. Once these various tube pressures are established, they are not varied, such time-fixed pressures in the tube motors establishing a simulation of a first human. Beforehand, a secondary sheet or layer of elastomer or deformable material (again such as 26) is placed over the primary layer or sheet. The second layer, as well as the primary layer, may be constructed in the manner already described. Thus, during operation of the animated mannequin representing a given first individual, the secondary or outer layer or sheet is operated in the manner previously described.

It will of course be immediately apparent that the secondary sheet or layer may be applied to the primary sheet prior to the establishment of the basic facial proportions established by a first set of steady-state pressure within the tube motors of the primary layer or stratum.

In the event that it is now desired, at a different point in time, to portray or to represent a second individual, then it is only necessary to establish a set of pressures within the tube elements of the primary layer and thereby define the basic facial proportions, etc., of the second human to be portrayed, and thereafter operate the secondary layer as before. Obviously, a great number of basic facial proportions may be defined by fixing a set of steady-state pressures within the tube motors of the primary layer. Thus, by this second aspect of the invention, the mannequin head is provided with a primary layer for establishing the basic facial proportions of an individual to be portrayed, while the secondary layer simulates emotions, and other facial movements which might accompany speech, for example, of the individual simulated. Thus, at different times, merely by changing facial makeup of an animated mannequin constructed in accordance with this invention, it is possible to portray a great number of individuals.

Figure 7:
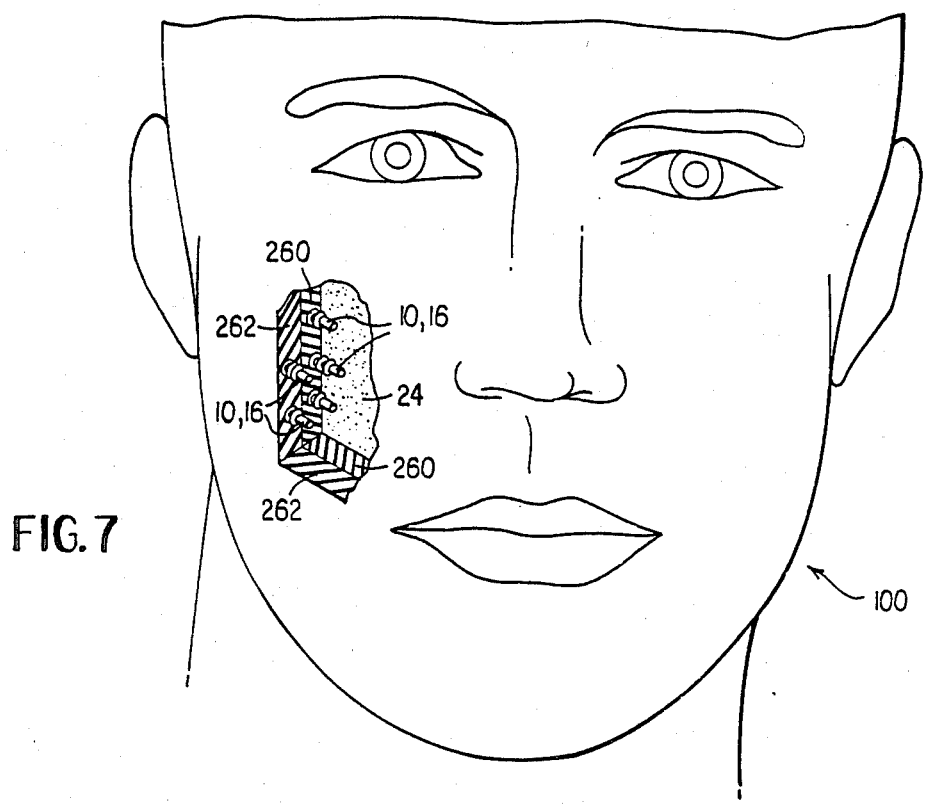
FIG. 7 is a cut-away view showing a mannequin head provided with two layers or strata of deformable material coupled to the tube motor elements of FIGS. 1 or 2.

The use of a primary and secondary layer or stratum is illustrated at FIG. 7 as employed with a mannequin head 100. A primary layer 260 is placed over the mannequin head. This stratum is of the same construction as stratum 26 shown at FIG. 4. Alternatively, it may be of the construction shown at FIGS. 3 or 3a. A secondary or outer stratum 262, of similar construction to 260, is superposed over stratum 260. The two strata may touch, as shown, or they may be separated by a deformable wall. Their operation is as follows.

The gross or major facial proportions of the individual to be simulated are fixed by actuation of the tube motors 10, 12 of primary stratum 260, the latter corresponding to layer 26 of FIG. 4. This may be done by routine experimentation, until the desired facial proportions are achieved. Thereafter, the fluid pressures in the various tube motors of the primary stratum are held constant in time.

The second stratum 262 is now operated as previously described with respect to FIGS. 1–6, i.e., as though the stratum 262 had been placed over a mannequin head having fixed, unchanging facial proportions.

If it is now desired to simulate an individual having different facial proportions, the pressures in tube motors 10, 12 of primary stratum 260 are varied to obtain (again by routine experimentation) the desired proportions.

While stratum 260 has been termed a primary stratum and stratum 262 has been termed a secondary stratum, that deformable elastomer stratum which is the outermost (262) is termed, in the claims, a first layer of stratum. Similarly, the innermost layer of stratum (260) is termed a second layer or stratum in the claims.

To facilitate an understanding of the invention the tube motors 10, 12 have been shown as parallel. In practice, it is preferable to arrange them in the manner of the actual facial muscles, as shown, by way of example, at FIG. 195 of page 299 of *Gray's Anatomy*, published by Bounty Books, New York, copyright 1977, incorporated by reference.

Figure 8:
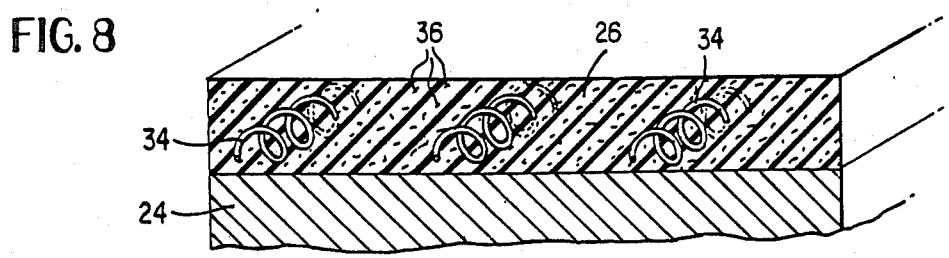
FIG. 8 is a view similar to FIG. 4 and showing yet another elongated motor element, here in the form of an electrically energized coil of wire.

Referring now to FIG. 8 of the drawings another modification of a motor element is shown, here also in combination with a skin-simulating layer or stratum. The numeral 26 denotes, as before, a stratum of an elastomer material, the stratum being placed on a portion of the surface 24 of a mannequin. Numeral 30 denotes any one of plurality of elongated spring elements in the form of coil springs. For clarity in presentation, only two coil springs are shown and the ends of these coil springs are illustrated as extending beyond an edge or section of the elastomer 26. The coils 30 are formed of an electrically conductive material, such as copper, and are embedded within the elastomer 26. The numeral 32 denotes small particles of ferromagnetic material such as soft iron.

The mode of operation of the embodiment of FIG. 8 will not be described. By means of suitable connections, not illustrated, electrical currents are passed through each of the individual coil spring elements 30. These springs may be relatively weak, since elasticity may be derived from the elastomer 26. The relative elasticity or resiliency between the elastomer 26 and the spring 30 may be varied for different applications. For greater spring elasticity, steel springs may be used. It is known that when an electrical current passes through two parallel wires, the current passing in the same direction in each wire, then the wires will undergo a force tending to move them towards one another. Because of this well known physical effect, the reader will now readily comprehend that adjacent turns or whorls of each of coil spring elements 30 will undergo a force tending to move them all together upon a passage of an electrical current through the coils. In order to enhance or make stronger this well known electromagnetic effect, ferromagentic particles 32 are added to the elastomer 26 so as to increase the strength of the magnetic field which arises by passage of current through coils 30. The art of combining ferromagnetic particles in flexible materials is known (U.S. Pat. Nos. 4,110,236 to Molina, 3,764,539 to Cochardt, 2,719,009, and 3,428,603 to Kroenke). It will now be apparent that upon passage of sufficient current through the coils they will contract in length and thereby deform the layer or stratum 26 in which they are embedded. The normal or steady-state current value in the coils may be such that there is slight shortening of the coils in this steady state, while an increase of current will cause further shortening and further consequent pinching of the elastomer 26. A lessening of the current will then result in relative stretching of the coils 30 with a consequent smoothing out or tensioning of the elastomer 26 in those regions immediately adjacent to the coils. Preferably, the coils 30 are placed relatively close to the exposed surface of skin-simulating stratum 26.

The reader will now be in the position to comprehend that coil springs 30 may be employed in a manner completely analogous to tube motor elements 10, 16 of the embodiment of FIGS. 1-6. Accordingly, it will be clear that coil springs 30 may be employed not only as illustrated in FIG. 6 (corresponding to FIG. 4) but also in the manner illustrated corresponding to FIGS. 3, 5 and 6. It will also be apparent that the embodiment of FIG. 8 may be employed in the manner shown and described in respect to FIG. 7.

Figure 9:
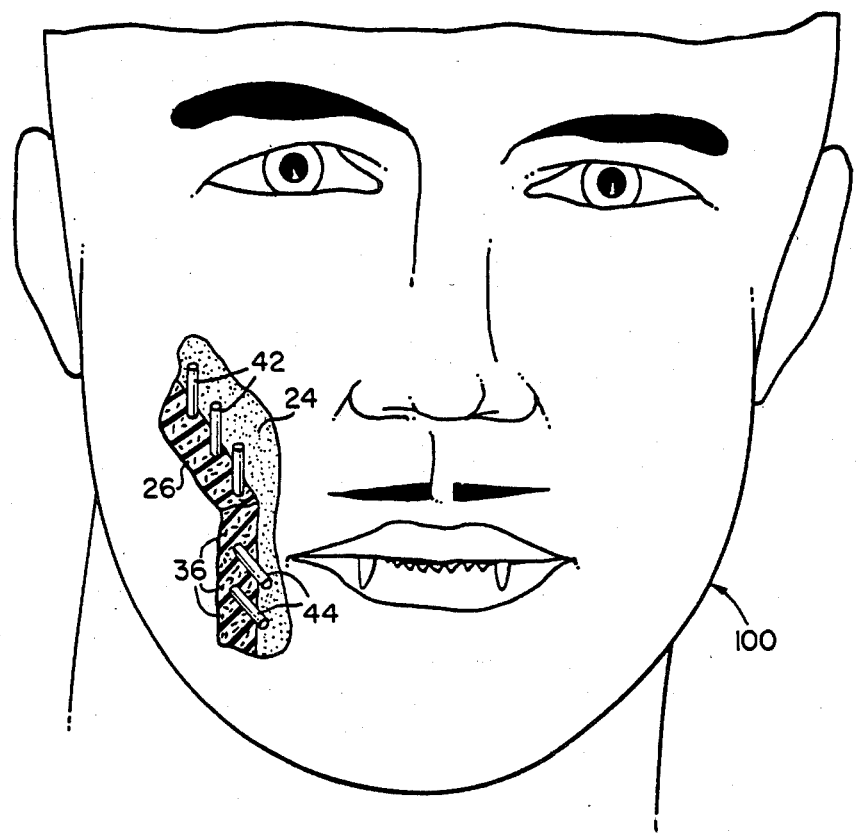
FIG. 9 is a view similar to FIG. 7 and illustrates another type of motor element.

Instead of helical coil spring motor elements, flexible wires which may also be embedded in a ferromagnetic particle containing elastomer may be employed. The wires are formed to assume the outline and contours of the mannequin face, the wires being parallel over at least partial segments thereof, as in the manner of a bird cage or a fencing mask. Passage of direct current through selected pairs and groups of pairs, determined by routine experimentation, will also result in simulation of facial expressions. For more faithful simulation, two grids of wires, at right angles to each other may be employed. This is illustrated at FIG. 9 wherein a first grid of generally parallel wires 42 is embedded in elastomer stratum 26 having ferromagnetic particles 36 dispersed therein. A second grid of wries 44 is oriented at right angles to the wires of the first gird. By means of suitble connections, not illustrated, each of the wires of the first and second grids may pass currents along their entire length or only along selected portions thereof. As in the embodiment of FIG. 8, the magnetic fields between adjacent, parallel wires cause them to move together, thus deforming the contiguous eleastomer stratum.

I claim:

1. A facially animated mannequin of the type including a substrate in the form of a head, simulated skin placed over a least a portion of the head to form a face, and motor elements intimately associated with the skin for distorting the latter so as to simulate various facial expressions, in which the motor elements comprise skin deforming members which are in contact with and fixed to the skin so as to be invisible externally thereof, and which are generally parallel to and in conformation with the contour of the skin, each motor element being capable of actuation independently of the other motor elements, the motor elements producing upon their actuation movement substantially only parallel to and in conformation with the contour of the skin, each motor element being capable of acutation independently of the other motor elements, whereby the deformation of one or more selected motor elements causes distortion and changes in the external appearance of the skin contiguous thereto, thereby simulating facial expressions, the skin and motor elements defining a first layer or stratum.

2. The facially animated mannequin of claim 1 wherein the mannequin head is provided with a second layer or stratum which is positioned interiorly of the first stratum, the second layer or stratum being of the same construction as the first layer or stratum, whereby the second layer or stratum is employed to establish a first set of basic facial proportions corresponding to a first simulated individual and whereby the second layer or stratum is employed to simulate facial expressions such as those occurring during conversation, and whereby the second layer or stratum may later in time be employed to establish a second set of basic facial proportions corresponding to a second simulated individual.

3. The facially animated mannequin of claim 1 wherein the mannequin head is provided with a second layer or stratum which is positioned interiorly of the first stratum, the second layer or stratum including an elastomer skin and motor elements intimately associated therewith for distorting said skin, whereby the second layer or stratum is employed to establish a first set of basic facial proportions corresponding to a first simulated individual and whereby the first layer or stratum is employed to simulate facial expressions such as those occurring during conversation, and whereby the second layer or stratum may later in time be employed to establish a second set of basic facial proportions corresponding to a second simulated individual.

4. The facially animated mannequin of claim 1 wherein the motor elements are at least partially embedded in the skin.

5. The facially animated mannequin of claim 4 wherein each bellows has spiral edges and valleys, and a coil spring is positioned in the valleys of each bellows member.

6. The facially animated mannequin of claim 1 wherein the motor elements are defined by coils each formed from an electrically conductive wire having spaced whorls, whereby the passage of a direct current through each coil gives rise to a force between adjacent whorls of that coil to thereby cause the coil to change its length, the coils being in contact with and fixed to the skin, whereby upon application of direct current to selected ones of the coils, changes in the external appearance of portions of the skin contiguous to those selected coils, due to distortion of the skin, are effected to thereby simulate facial expressions.

7. The animated mannequin construction claim 6 wherein said coils are embedded in the simulated skin.

8. The facially animated mannequin of claim 6 wherein ferromagnetic particles are dispersed in the skin, whereby the ferromagentic particles increase the effective magnetic permeability of the skin to thereby increase the force between adjacent whorls of each coil when a current is passed therethrough.

9. The facially animated mannequin of claim 1 wherein the motor elements are arranged with respect to each other in the manner of human facial muscles.

10. The facially animated mannequin of claim 1 wherein at least one of the motor elements is defined by a generally helical coil whose longitudinal axis is substantially annular, to thereby simulate the human facial muscle orbicularis palpebrarum around the eyes or orbicularis oris around the mouth, the coil formed from an electrically conductive wire, whereby the passage of a direct current through the coil gives rise to a force between adjacent whorls of the coil to thereby cause the helical coil to change its length, means for mounting and supporting the annular coil to permit the coil to move radially from a normal position to a radially changed position upon the passage of direct current through the coil.

11. The facially animated mannequin of claim 10 wherein said mounting and supporting means includes radially disposed slots in the head substrate, the slots carrying mounting members slidable therein, the annular coil being mounted on and supported by the slidable mounting members, the mounting members being spaced from each other along the annular longitudinal axis of the coil.

12. The facially animated mannequin of claim 11 wherein said mounting members are defined by railroad rail like members whose web portions include at least one through slot which receives at least one whorl of said coil, said coil being a continuous helical coil at least a portion of whose whorls encircle the upper, rounded portion of the mounting members, whereby the passage of direct current through the coil causes the coil to radially contract from the normal position by virtue of a force of attraction between adjacent whorls of the coil.

13. The facially animated mannequin of claim 12 wherein said coil is resilient and thus returns to a normal position when not energized.

14. The facially animated mannequin of claim 11 wherein said mounting members are defined by railroad rail like members, and whereby the major annular extent of the whorls of the coil, at those portions of the coil which are supported by the mounting members, encircles the upper, rounded portion of the mounting members, each whorl being generally circular and joined at its ends to the ends of its next adjacent whorls, by generally V-shaped segments, whereby the passage of direct current through the coil causes the coil to radially expand from a normal position by virtue of a force of repulsion between adjacent whorls of the coil.

15. The facially animated mannequin of claim 14 wherein said coil is resilient and thus returns to a normal position when not energized.

16. The facially animated mannequin of claim 6 wherein the coils are helical coils and the force between adjacent whorls is a force of attraction to thereby cause the coil to contract along its length.

17. The facially animated mannequin of claim 6 wherein the coils are generally helical, each whorls of a coil being generally circular and joined at its ends to the ends of its next adjacent whorl by generally V-shaped segments, wherein the forced between adjacent whorls is a force of repulsion to thereby cause the coil to expand along its length.

18. The facially animated mannequin of claim 1 wherein the motor elements are defined by conductive, flexible wires, each wire being parallel to an adjacent wire over at least segments of its length, the wires being embedded in said skin, whereby the passage of a direct current through selected pairs or portions of selected pairs of the wires gives rise to a force of attraction between adjacent, parallel segments of the selected pairs or portions thereof to thereby cause the parallel segments to move towards each other at right angles to their length, whereby upon application of direct current to the coils, changes in the external appearance of portions of the skin contiguous to selected pairs or portions of parallel segments, due to distortion of the skin, are effected to thereby simulate facial expressions.

19. The facially animated mannequin of claim 18 wherein the wires form two grids of wires at right angles to each other, each of the two grids defined by parallel wires.

20. The facially animated mannequin of claim 18 wherein ferromagnetic particles are dispersed in the skin, whereby the ferromagnetic particles increase the effective magnetic permeability of the skin to thereby increase the force of attraction between adjacent wire segments when a current is passed therethrough.

21. The animated mannequin of claim 1 wherein the motor element are completely embedded in the skin.

22. The facially animated mannequin of claim 1 wherein the motor elements are defined by expansible tubes which upon their actuation produce motion with negligible increase of their diameters, the tubes varying their lengths upon variation in fluid pressure therein.

23. The animated mannequin construction of claim 22 wherein said tubes are elastic and have the property of contracting to a normal length upon relaxation of fluid pressure therein.

24. The animated mannequin construction of claim 22 wherein said skin is elastic, the skin having a normal configuration, whereby increase of fluid pressure within any tube causes the skin contiguous to that tube to stretch parallel to the direction of tube elongation and whereby relaxation of fluid pressure within that tube results in the skin returning to its normal configuration.

25. The facially animated mannequin construction of claim 24 wherein said skin is in the form of a sheet and wherein the tubes are positioned between the head substrate and the skin sheet.

26. The facially animated mannequin construction of claim 24 wherein said skin is in the form of a layer whose thickness is greater than the diameter of the tubes and wherein said tubes are at least partially embedded in said layer.

27. The facially animated mannequin construction of claim 26 wherein said tubes are completely embedded in said layer.

28. The facially animated mannequin construction of claim 22 wherein the expansible tubes are defined by bellows.

29. The facially animated mannequin construction of claim 23 wherein the expansible tubes are defined by bellows.

30. The facially animated mannequin construction of claim 24 wherein the expansible tubes are defined by bellows.

31. The facially animated mannequin construction of claim 25 wherein the expansible tubes are defined by bellows.

32. The facially animated mannequin construction of claim 26 wherein the expansible tubes are defined by bellows.

33. The facially animated mannequin construction of claim 27 wherein the expansible tubes are defined by bellows.

34. The facially animated mannequin of claim 28 wherein each bellows has spiral edges and valleys, and a coil spring is positioned in the valleys of each bellows member.

35. The facially animated mannequin of claim 29 wherein each bellows has spiral edges and valleys, and a coil spring is positioned in the valleys of each bellows member.

36. The facially animated mannequin of claim 30 wherein each bellows has spiral edges and valleys, and a coil spring is positioned in the valleys of each bellows member.

37. The facially animated mannequin of claim 31 wherein each bellows has spiral edges and valleys, and a coil spring is positioned in the valleys of each bellows member.

38. The facially animated mannequin of claim 32 wherein each bellows has spiral edges and valleys, and a coil spring is positioned in the valleys of each bellows member.

* * * * *

UNITED STATES PATENT AND TRADEMARK OFFICE
CERTIFICATE OF CORRECTION

PATENT NO.   : 4,683,669

DATED        : August 4, 1987

INVENTOR(S)  : Thomas J. Greer, Jr.

It is certified that error appears in the above-identified patent and that said Letters Patent is hereby corrected as shown below:

Figure 8 of the drawings:

>     The numeral 34 should be 30
>             and the
>         numeral 36 should be 32

Signed and Sealed this

Twelfth Day of July, 1988

Attest:

DONALD J. QUIGG

*Attesting Officer*         *Commissioner of Patents and Trademarks*

UNITED STATES PATENT AND TRADEMARK OFFICE
CERTIFICATE OF CORRECTION

PATENT NO. : 4,683,669

DATED : August 4, 1987

INVENTOR(S) : Thomas J. Greer, Jr.

It is certified that error appears in the above—identified patent and that said Letters Patent is hereby corrected as shown below:

Column 3, line 5, change "different" to --difference--.

Column 5, line 39, change "2" to --26--.

Column 6, line 40, change "employes" to --employs--.

Column 7, lines 27 and 28, change "pressure" to --pressures--; and
  line 67, change "previusly" to --previously--.

Column 8, lines 10 and 11, change "of" to --or--; and
  lines 52 and 53, change "ferromagentic" to --ferromagnetic--.

Column 9, line 29, change "wries" to --wires--.

Column 10, line 39, before "claim" insert --of--; and
  line 43, change "ferromagentic" to --ferromagnetic--.

Column 11, line 65, change "ferromagentic" to --ferromagnetic--.

Column 12, line 2, change "element" to --elements--.

Change the dependency of claim 5, at Column 10, line 23, from "4" to --33--.

UNITED STATES PATENT AND TRADEMARK OFFICE
CERTIFICATE OF CORRECTION

PATENT NO. : 4,683,669

DATED : August 4, 1987

INVENTOR(S) : Thomas J. Greer, Jr.

It is certified that error appears in the above-identified patent and that said Letters Patent is hereby corrected as shown below:

```
Column 2, line 37, change "fascia" to --fascis--; and
         line 39, after "different" insert a period.

Column 3, line 31, change "fascia" to --fascis--.

Column 5, line 30, change "substrate" to --stratum--; and
         line 63, change "fasces" to --fascis--.

Column 8, lines 25, 30, 37, 40, 49, 55 and 68, change
         "30" to --34--;
         lines 32 and 53, change "32" to --36--; and
         line 27, change "two" to --three--.

Column 9, lines 2, 6 and 9, change "30" to --34--.

Column 11, line 38, change "whorls" to --whorl--; and
          line 41, change "forced" to --force--.

Figure 8 of the drawings: The changed numeral "30" should
         be --34-- and the changed numeral "32" should
         be --36--.
```

Signed and Sealed this

Twenty-sixth Day of December, 1989

Attest:

JEFFREY M. SAMUELS

*Attesting Officer*   *Acting Commissioner of Patents and Trademarks*